(12) United States Patent
Gu

(10) Patent No.: US 7,100,931 B2
(45) Date of Patent: Sep. 5, 2006

(54) ROTATION CONTROL BRAKE SYSTEM

(75) Inventor: Hong Jiun Gu, P.O. Box 99-141, Taipei (TW)

(73) Assignees: Hong Jiun Gu, Taipei (TW); Jar Chen Wang, Cerritos, CA (US)

( * ) Notice: Subject to any disclaimer, the term of this patent is extended or adjusted under 35 U.S.C. 154(b) by 157 days.

(21) Appl. No.: 10/876,410

(22) Filed: Jun. 25, 2004

(65) Prior Publication Data

US 2005/0285369 A1 Dec. 29, 2005

(51) Int. Cl.
*B62K 13/06* (2006.01)

(52) U.S. Cl. .................................. 280/288.4; 74/501.6

(58) Field of Classification Search ............. 280/288.4, 280/264; 74/501.6, 502; 188/24.11, 24.12, 188/24.19, 24.21
See application file for complete search history.

(56) References Cited

U.S. PATENT DOCUMENTS

| | | | | |
|---|---|---|---|---|
| 5,913,943 A * | 6/1999 | Viola | ........................... | 74/489 |
| 6,095,309 A * | 8/2000 | Mione | ......................... | 192/217 |
| 6,328,138 B1 * | 12/2001 | Takizawa | ................. | 188/24.11 |
| 6,651,523 B1 * | 11/2003 | Chou | ........................ | 74/502.2 |
| 6,829,963 B1 * | 12/2004 | Liao | .......................... | 74/502.2 |

* cited by examiner

*Primary Examiner*—Tony Winner
(74) *Attorney, Agent, or Firm*—Raymond Y. Chan; David & Raymond Patent Group

(57) ABSTRACT

A rotation control brake system includes a tubular brake actuator coaxially mounted at a steering handle of a rider propelling vehicle, a brake unit operatively mounted at a position close to a driving wheel of the rider propelling vehicle, and a brake cable having a driving end coupling with the brake unit and an opposed actuating end extended to couple with the brake actuator to retain the brake actuator at a normal driving position. wherein at a braking position, the brake actuator is rotatably, longitudinally and outwardly slid with respect to the steering handle to pull the brake cable that the brake unit is biased against the driving wheel to control a rotational speed of the driving wheel, such that the rider propelling vehicle is adapted for being well controlled while the rider keeps the hand thereof at the steering handle.

23 Claims, 3 Drawing Sheets

ROTATION CONTROL BRAKE SYSTEM

BACKGROUND OF THE PRESENT INVENTION

1. Field of Invention

The present invention relates to a rider propelling vehicle, and more particularly to a rotation control brake system for a rider propelling vehicle such as bicycle or scooter, wherein the rotation control brake system comprises a brake actuator rotatably mounted to a steering handle of the rider propelling vehicle to control the speed thereof through the rotational movement of the brake actuator.

2. Description of Related Arts

Nowadays, rider propelling vehicles, such as bicycles, strollers, or scooters, are well known and have been considered as a form of transportation, recreation, and exercise. A conventional rider propelling vehicle comprises a supporting frame, having a steering handle, for supporting a rider, at least two wheels spacedly and rotatably mounted to the supporting frame, transmission unit linked to one of the wheels as a driving wheel for transmitting human power to a rotational power at the driving wheel, and a brake system for controlling a rotational speed of the driving wheel.

For example, when the rider rides a bicycle as the rider propelling vehicle, the rider applies the human power at a bicycle pedal to drive the driving wheel to rotate through a transmitting chain of the transmission unit. In addition, the brake system comprises a brake pad coupling with the driving wheel, a brake handle pivotally mounted at the steering handle, and a brake cable having one end coupling with the brake pad and another end coupling with the brake handle in such a manner that when the rider pivotally presses the brake handle towards the steering handle, the brake pad is driven to press against the driving wheel through the brake cable to reduce the speed of the bicycle. Likewise, the scooter has the similar structural design except the rider is riding the scooter in a standing position. However, such brake system has several drawbacks.

For safety purpose, the rider should normally grip the steering handle during riding. However, the rider must release his or her fingers to reach the brake handle in order to press against the brake handle during braking operation. Therefore, the rider may easily loss control of the rider propelling vehicle at the time the fingers of the rider leave the steering handle.

In addition, the rider, such as a young child, has a smaller hand that the fingers of the rider cannot substantially extend to reach the brake handle such that the rider has insufficient pressing power to grip the brake handle so that the brake handle of such brake system is not practical in use. Since the brake handle is transversely extended from the steering handle, the cloth of the rider may accidentally catch at the outer free end of the brake handle which may tangle with the hand of the rider and may cause an unwanted injury.

Furthermore, an improved rider propelling vehicle is designed to be folded up into a compact unit for easy storage and transportation. However, the pivotal connection of the brake handle occupies the space of the steering handle such that the brake handle will form as an obstruction to block the folding operation of the improved rider propelling vehicle.

SUMMARY OF THE PRESENT INVENTION

A main object of the present invention is to provide a rotation control brake system for a rider propelling vehicle such as bicycle or scooter, wherein the rotation control brake system comprises a brake actuator rotatably mounted to a steering handle of the rider propelling vehicle to control the speed thereof through the rotational movement of the brake actuator.

Another object of the present invention is to provide a rotation control brake system, wherein the brake actuator is coaxially mounted to the steering handle such that no obstruction is transversely extended from the steering handle so as to prevent an unwanted injury caused by the brake actuator.

Another object of the present invention is to provide a rotation control brake system, wherein the brake actuator not only coaxially rotates about the steering handle but also longitudinally slides along the steering handle to integrate with the human mechanism when the brake actuator is rotated during the braking operation, which is advantage the practice use.

Another object of the present invention is to provide a rotation control brake system, which comprises a guiding unit for substantially guiding the rotational and longitudinal movement of the brake actuator with respect to the steering handle.

Another object of the present invention is to provide a rotation control brake system, which does not require altering the original simple structure of the rider propelling vehicle so as to reduce the manufacturing cost of the rider propelling vehicle incorporating with the rotation control brake system.

Another object of the present invention is to provide a rotation control brake system, wherein no expensive or complicated structure is required to employ in the present invention in order to achieve the above mentioned objects. Therefore, the present invention successfully provides an economic and efficient solution not only for providing a simple configuration for the rider propelling vehicle but also for providing easy braking operation to control the speed of the rider propelling vehicle.

Accordingly, in order to accomplish the above objects, the present invention provides a rider propelling vehicle, comprising:

a supporting frame, having a steering handle, for supporting a rider;

at least a driving wheel rotatably mounted to the supporting frame, a transmission device operatively linked to the driving wheel for transmitting a human power of the rider to a rotational power at the driving wheel; and a rotation control brake system, comprising:

a tubular brake actuator coaxially mounted at the steering handle for a hand of the rider griping the brake actuator to steer the rider propelling vehicle via the steering handle;

a brake unit operatively mounted on the supporting frame at a position close to the driving wheel; and a brake cable having a driving end coupling with the brake unit and an opposed actuating end extended to couple with the brake actuator to retain the brake actuator at a normal driving position, wherein at the driving position, the brake unit is spaced apart from the driving wheel such that the driving wheel is allowed to freely rotate with respect to the supporting frame, and at a braking position, the brake actuator is rotatably, longitudinally and outwardly slid with respect to the steering handle to pull the brake cable that the brake unit is biased against the driving wheel to control a rotational speed of the driving wheel, such that the rider propelling vehicle is adapted for being well controlled while the rider keeps the hand thereof at the steering handle.

These and other objectives, features, and advantages of the present invention will become apparent from the following detailed description, the accompanying drawings, and the appended claims.

DETAILED DESCRIPTION OF THE PREFERRED EMBODIMENT

Figure 1:
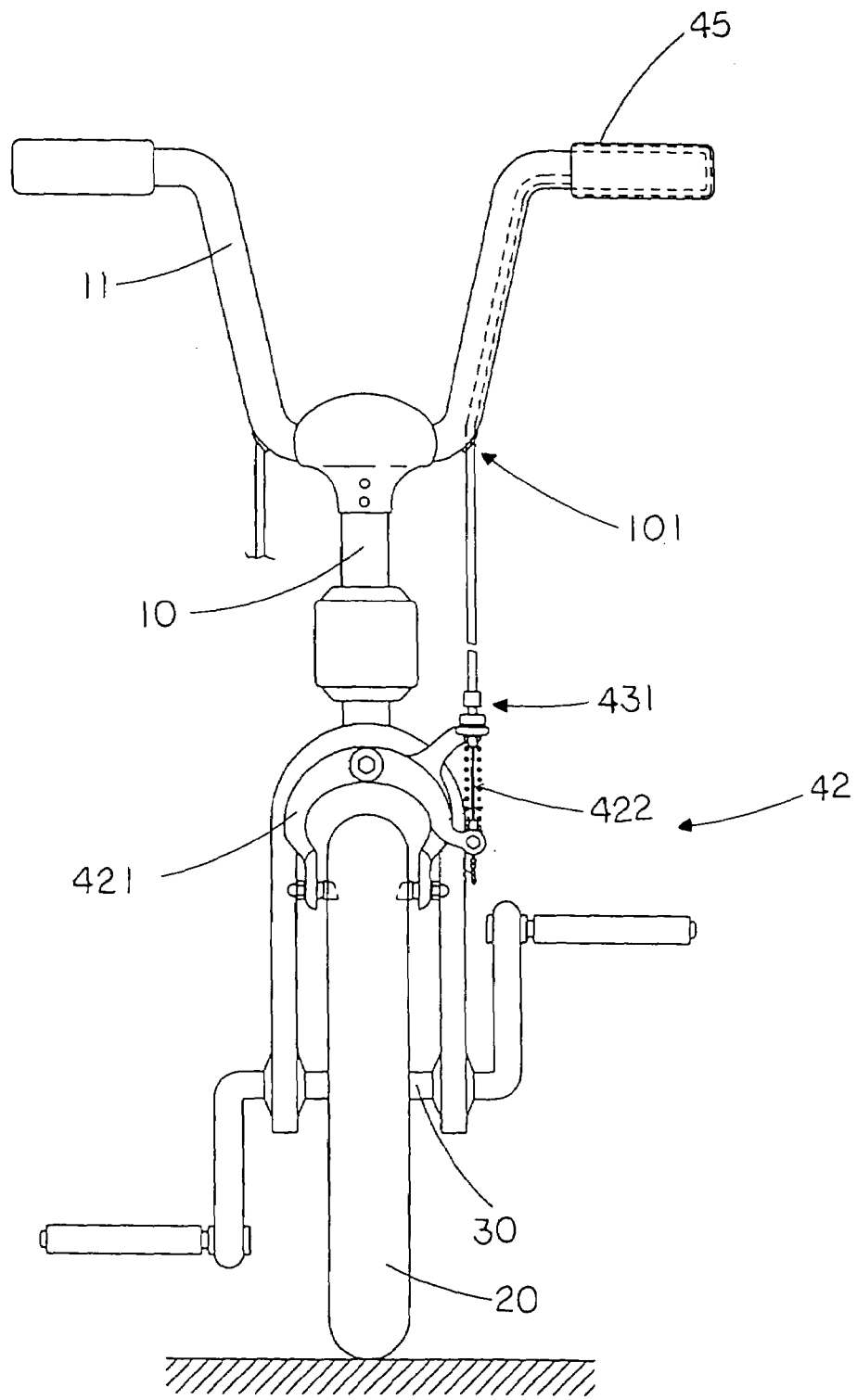
FIG. 1 is a front view of a rider propelling vehicle incorporated with a rotation control brake system according to a preferred embodiment of the present invention.
Figure 2:
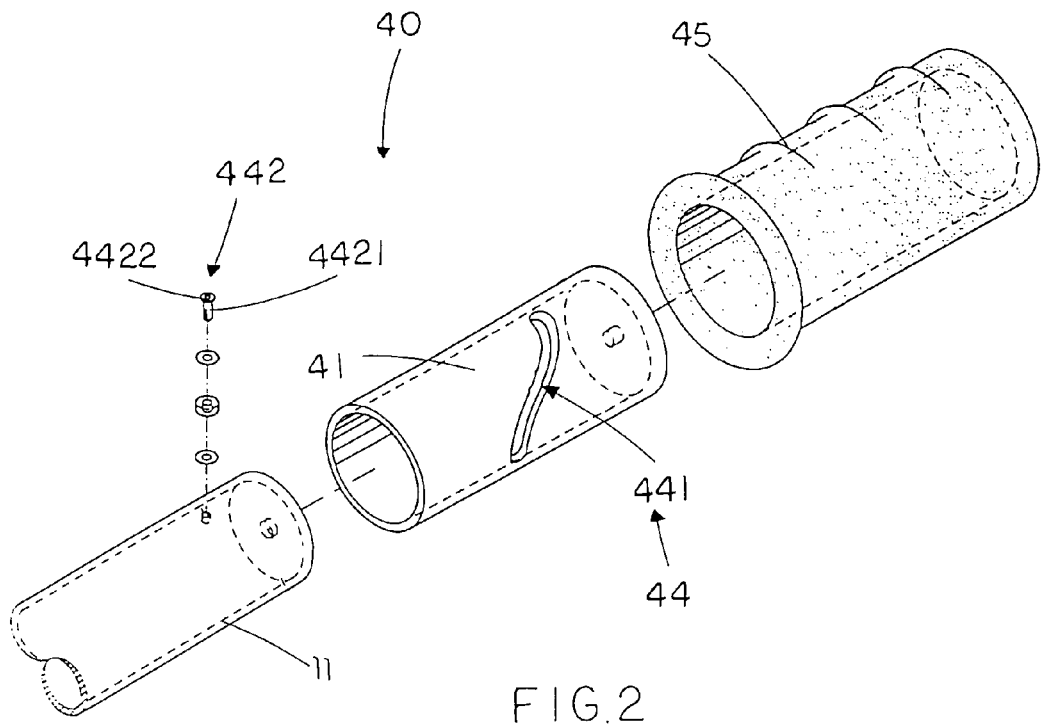
FIG. 2 is an exploded perspective view of a brake actuator of the rotation control brake system according to the above preferred embodiment of the present invention.
Figure 3:
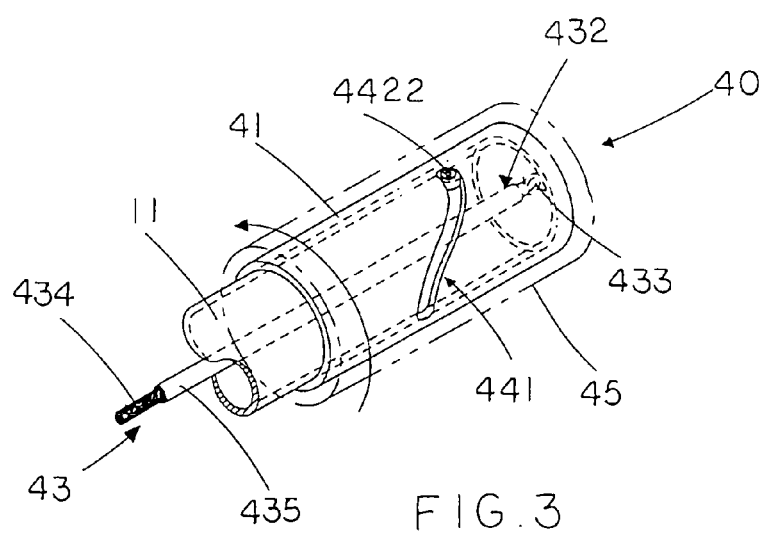
FIG. 3 is a perspective view of the brake actuator of the rotation control brake system according to the above preferred embodiment of the present invention.

Referring to FIGS. 1 through 3 of the drawings, a rider propelling vehicle according to a preferred embodiment of the present invention is illustrated, wherein the rider propelling vehicle is embodied as a bicycle as an example while the rider propelling vehicle can be constructed as a stroller or a scooter.

The rider propelling vehicle comprises a supporting frame 10, having a steering handle 11, for supporting a rider, at least a driving wheel 20 rotatably mounted to the supporting frame 10, a transmission device 30 operatively linked to the driving wheel 20 for transmitting a human power of the rider to a rotational power at the driving wheel 20, and a rotation control brake system 40.

Accordingly, the bicycle of the rider propelling vehicle comprises two driving wheels 20 wherein the transmission device 30 comprises an endless transmission chain linked between one of the driving wheels 20 and a bicycle pedal of the supporting frame 20 to convert the human power applied on the bicycle pedal into the rotational power of the respective driving wheel 20 through the transmission device 30.

The rotation control brake system 40 comprises a tubular brake actuator 41 coaxially mounted at the steering handle 11 for a hand of the rider griping the brake actuator 41 to steer the rider propelling vehicle via the steering handle 11, a brake unit 42 operatively mounted on the supporting frame 10 at a position close to the driving wheel 20, and a brake cable 43 having a driving end 431 coupling with the brake unit 42 and an opposed actuating end 432 extended to couple with the brake actuator 41 to retain the brake actuator 41 at a normal driving position.

At the driving position, the brake unit 42 is spaced apart from the driving wheel 20 such that the driving wheel 20 is allowed to freely rotate with respect to the supporting frame 11, and at a braking position, the brake actuator 41 is rotatably, longitudinally and outwardly slid with respect to the steering handle 11 to pull the brake cable 43 that the brake unit 42 is biased against the driving wheel 20 to control a rotational speed of the driving wheel 20, such that the rider propelling vehicle is adapted for being well controlled while the rider keeps the hand thereof at the steering handle 11.

According to the preferred embodiment, the brake actuator 41, which is made of rigid material such as metal, has an inner diameter slightly larger than an outer diameter of the steering handle 11, wherein the brake actuator 41 is fittingly mounted at the steering handle 11 in a slidably movable manner such that the rider is able to steer the rider propelling vehicle when the hand of the rider grips the brake actuator 41.

The brake unit 42 comprises two brake members 421 pivotally mounted at the supporting frame 10 at a position that the driving wheel 20 is positioned between the two brake members 421 and a retention element 422 coupled with the brake arms 421 to retain the two brake members 421 spaced apart from the driving wheel 20.

The driving end 431 of the brake cable 43 is extended to couple with the brake members 421 such that when the brake cable 43 is pulled by the brake actuator 41, the brake members 421 are driven to bias against two sides of the driving wheel 20 respectively so as to reduce the rotational speed of the driving wheel 20.

As shown in FIG. 3, the actuating end 432 of the brake cable 43 is extended within an interior of the steering handle 11 to couple with the brake actuator 41 such that when the brake actuator 41 is slid outwardly along the steering handle 11, the driving end 431 of the brake cable 43 is pulled to actuate the brake members 421 of the brake unit 42. It is worth to mention that the brake cable 43 is retained in a predetermined tension between the driving end 431 and the actuating end 432 when the driving end 431 and the actuating end 432 of the brake cable 43 are securely fastened with the brake unit 42 and the brake actuator 41 respectively.

As shown in FIG. 3, a portion of the brake cable 43 is extended within an interior of the supporting frame 10 through a through hole 101 thereon to the steering handle 11 such that the brake cable 43 is hidden within the supporting frame 10. The brake cable 43 comprises a cable body 434 made of stiff material such as metal wire and a protective shelter 435 enclosed the cable body 43 therewithin for protection purpose.

Figure 4:
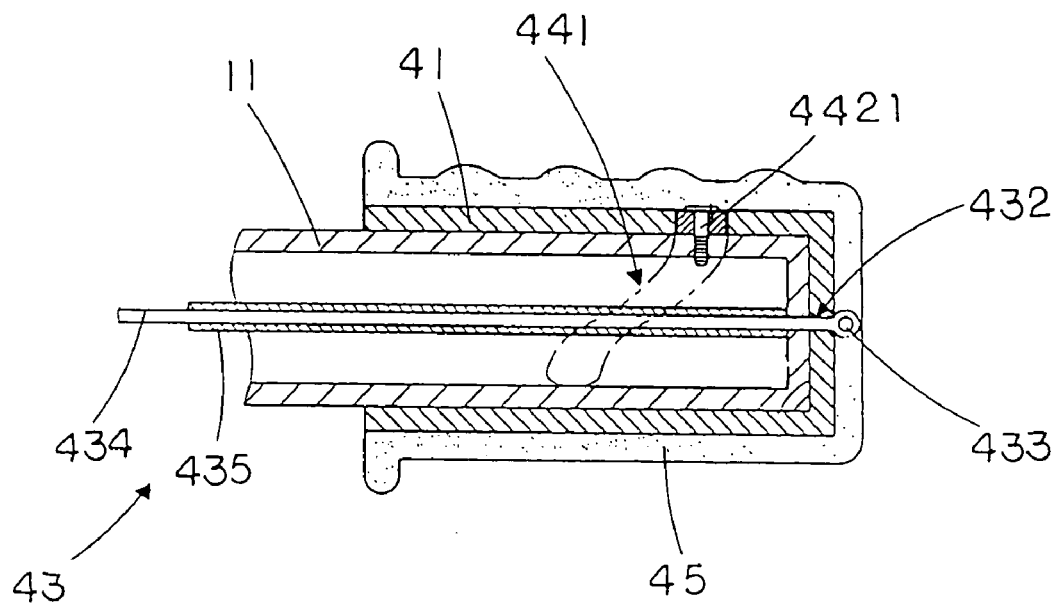
FIG. 4 is a sectional view of the brake actuator of the rotation control brake system at the normal driving position according to the above preferred embodiment of the present invention.

Accordingly, the actuating end 432 of the brake cable 43 is slidably penetrated through sidewalls of the steering handle 11 and the brake actuator 41 to an exterior thereof wherein a fastening element 433 is securely fastened at the actuating end 432 of the brake cable 43 to securely mount the actuating end 432 of the brake cable 43 at the brake actuator 41, as shown in FIG. 4.

It is worth to mention that the retention element 422 is embodied as a compression spring for applying an urging force against the brake members 421 so as to normally pull the brake actuator 41 to inwardly slide on the steering handle 11 through the brake cable 43.

As shown in FIG. 2, the rotation control brake system further comprises a rotational guider 44 which has a guiding slot 441 spirally formed on a circumferential wall of the brake actuator 41 and comprises a guiding arm 442 extended from the steering handle 11 to slidably engage with the guiding slot 441 in such a manner that when the brake actuator 41 is rotated around the steering handle 11, the guiding arm 442 is guided to slide along the guiding slot 441 to drive the brake actuator 41 to outwardly slide on the steering handle 11, so as to pull the brake cable 43.

Figure 5:
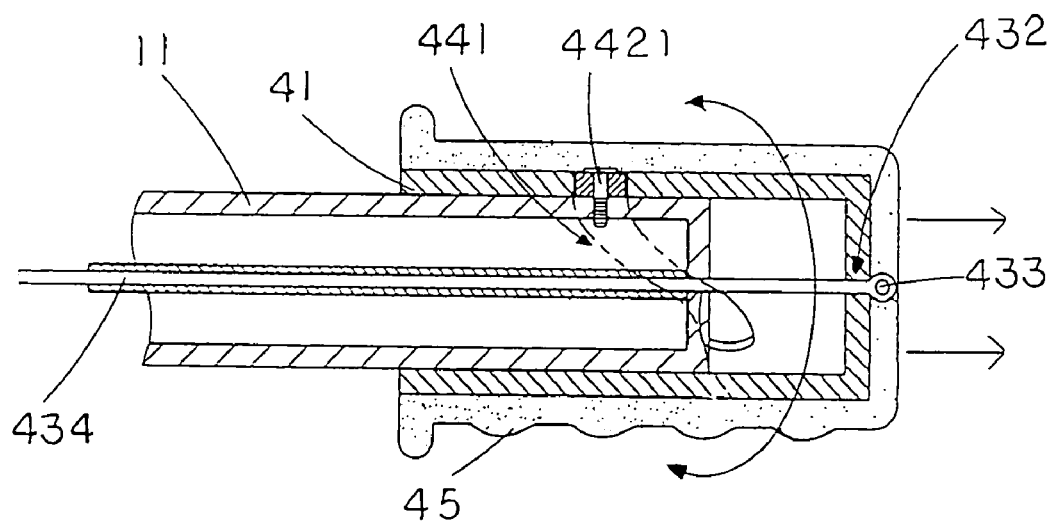
FIG. 5 is a sectional view of the brake actuator of the rotation control brake system at the braking position according to the above preferred embodiment of the present invention.

Accordingly, the guiding slot 441 has a predetermined length longer than a traveling distance of the brake actuator 41 between the driving position and the braking position such that the brake actuator 41 is guided to turn and slide on the steering handle 11 simultaneously, as shown in FIGS. 4 and 5. In other words, the brake actuator 41 is slide on the steering handle 11 in a spiral moving manner.

As shown in FIGS. 2 and 3, the guiding slot 441, having a S-shaped, is inclinedly and outwardly extended on the circumferential wall of the brake actuator 41 such that when the brake actuator 41 is rotated around the steering handle 11, the guiding arm 442 is guided to slide along the guiding slot 441 end-to-end, so as to push the brake actuator 41 to outwardly and longitudinally slide on the steering handle 11.

The guiding arm 442 has an arm body 4421 upwardly mounted on a circumferential wall of the steering handle 11 to extend through the guiding slot 441 and an enlarged head portion 4422 integrally extended from the arm body 4421 at a position above the circumferential wall of the brake actuator 41 to retain the arm body 4421 within the guiding slot 441 in position.

As shown in FIG. 2, the rotation control brake system 40 further comprises a tubular anti-slipping shelter 45 coaxially mounted at the brake actuator 41 to drive the brake actuator 41 to rotate. Accordingly, the anti-slipping shelter 45 is made of anti-slipping material such as rubber substantially mounted on the brake actuator 41 wherein an inner circumferential wall of the anti-slipping shelter 45 is frictionally engaged with the circumferential wall of the brake actuator 41 so as to enhance the gripping ability of the brake actuator 41 when the hand of the rider grips and turns the anti-slipping shelter 45.

In order to operate the rotation control brake system 40, the rider does not require releasing his or her fingers from the steering handle 11 to brake the rider propelling vehicle. The rider is able to control and steer the rider propelling vehicle by normally gripping the brake actuator 41. In order to reduce the speed of the rider propelling vehicle, the rider is able to apply a rotational force on the brake actuator 41 such that the brake actuator 41 is arranged to rotate about the steering handle 11. At the same time, the brake actuator 41 is guided to longitudinally and outwardly slide on the steering handle via the rotational guider 44 so as to pull the brake cable 43. Therefore, the brake members 421 are driven to bias against the two sides of the driving wheel 20 respectively so as to reduce the rotational speed of the driving wheel 20.

It is worth to mention that the rider is able to further rotate the brake actuator 41 until the guiding arm 442 reaches at the corresponding end of the guiding slot 441 for increasing the pulling force against the brake cable 43. Therefore, the brake members 421 are driven to enhance the biasing forces on the driving wheel 20 to further reduce the rotational speed of the driving wheel 20. In other words, the rider is able to control the braking force for the rider propelling vehicle by the rotational force on the brake actuator 41, so as to well control the speed of the rider propelling vehicle.

Once the rotational force is released from the brake actuator 41, the compression spring of the retention element 422 is rebounded to its original form that the brake actuator 41 is pulled to rotatably and inwardly slide back to the driving position. It is worth to mention that during the brake operation, the rider keeps the hand thereof on the brake actuator 41 such that the rider is able to brake and steer the rider propelling vehicle at the same time.

It is worth to mention that the rotational control brake system 40 is adapted to incorporate with other riding propelling vehicles, such as scooters or strollers, having the steering handle 11 so as to control the speed of the riding propelling vehicle by a rotational force.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A rider propelling vehicle, comprising:
a supporting frame, having a steering handle, for supporting a rider;
at least a driving wheel rotatably mounted to said supporting frame,
a transmission device operatively linked to said driving wheel for transmitting a human power of said rider to a rotational power at said driving wheel; and
a rotation control brake system, comprising:
a tubular brake actuator coaxially mounted at said steering handle for a hand of said rider griping said brake actuator to steer said rider propelling vehicle via said steering handle;
a brake unit operatively mounted on said supporting frame at a position close to said driving wheel; and
a brake cable having a driving end coupling with said brake unit and an opposed actuating end extended to couple with said brake actuator to retain said brake actuator at a normal driving position, wherein at said driving position, said brake unit is spaced apart from said driving wheel such that said driving wheel is allowed to freely rotate with respect to said supporting frame, and at a braking position, said brake actuator is rotatably, longitudinally and outwardly slid with respect to said steering handle to pull said brake cable that said brake unit is biased against said driving wheel to control a rotational speed of said driving wheel, such that said rider propelling vehicle is adapted for being well controlled while said rider keeps said hand thereof at said steering handle.

2. A rider propelling vehicle, as recited in claim 1, wherein said rotation control brake system further comprises a rotational guider which has a guiding slot spirally formed on a circumferential wall of said brake actuator and comprises a guiding arm extended from said steering handle to slidably engage with said guiding slot in such a manner that when said brake actuator is rotated around said steering handle, said guiding arm is guided to slide along said guiding slot to drive said brake actuator to outwardly slide on said steering handle so as to pull said brake cable.

3. A rider propelling vehicle, as recited in claim 2, wherein said guiding slot has a predetermined length longer than a traveling distance of said brake actuator between said driving position and said braking position such that said brake actuator is guided to turn slide on said steering handle simultaneously.

4. A rider propelling vehicle, as recited in claim 2, wherein said guiding slot, having a S-shaped, is inclinedly and outwardly extended on said circumferential wall of said brake actuator such that when said brake actuator is rotated around said steering handle, said guiding arm is guided to slide along said guiding slot end-to-end, so as to push said brake actuator to outwardly and longitudinally slide on said steering handle.

5. A rider propelling vehicle, as recited in claim 3, wherein said guiding slot, having a S-shaped, is inclinedly and outwardly extended on said circumferential wall of said brake actuator such that when said brake actuator is rotated around said steering handle, said guiding arm is guided to slide along said guiding slot end-to-end, so as to push said brake actuator to outwardly and longitudinally slide on said steering handle.

6. A rider propelling vehicle, as recited in claim 2, wherein said guiding arm has an arm body upwardly mounted on a circumferential wall of said steering handle to extend through said guiding slot and an enlarged head portion integrally extended from said arm body at a position above said circumferential wall of said brake actuator to retain said arm body within said guiding slot in position.

7. A rider propelling vehicle, as recited in claim 5, wherein said guiding arm has an arm body upwardly mounted on a circumferential wall of said steering handle to extend through said guiding slot and an enlarged head portion integrally extended from said arm body at a position above said circumferential wall of said brake actuator to retain said arm body within said guiding slot in position.

8. A rider propelling vehicle, as recited in claim 1, wherein said brake cable is slidably extended into an interior of said supporting frame to fasten with said brake actuator through an interior of said steering handle.

9. A rider propelling vehicle, as recited in claim 3, wherein said brake cable is slidably extended into an interior of said supporting frame to fasten with said brake actuator through an interior of said steering handle.

10. A rider propelling vehicle, as recited in claim 7, wherein said brake cable is slidably extended into an interior of said supporting frame to fasten with said brake actuator through an interior of said steering handle.

11. A rider propelling vehicle, as recited in claim 3, wherein said rotation control brake system further comprises a tubular anti-slipping shelter, which is made of anti-slipping material, coaxially mounted at said brake actuator to drive said brake actuator to rotate, wherein an inner circumferential wall of said anti-slipping shelter is frictionally engaged with said brake actuator for enhancing a gripping ability of said brake actuator when said hand of said rider grips and turns said anti-slipping shelter.

12. A rider propelling vehicle, as recited in claim 7, wherein said rotation control brake system further comprises a tubular anti-slipping shelter, which is made of anti-slipping material, coaxially mounted at said brake actuator to drive said brake actuator to rotate, wherein an inner circumferential wall of said anti-slipping shelter is frictionally engaged with said brake actuator for enhancing a gripping ability of said brake actuator when said hand of said rider grips and turns said anti-slipping shelter.

13. A rider propelling vehicle, as recited in claim 10, wherein said rotation control brake system further comprises a tubular anti-slipping shelter, which is made of anti-slipping material, coaxially mounted at said brake actuator to drive said brake actuator to rotate, wherein an inner circumferential wall of said anti-slipping shelter is frictionally engaged with said brake actuator for enhancing a gripping ability of said brake actuator when said hand of said rider grips and turns said anti-slipping shelter.

14. A rotation control brake system for a rider propelling vehicle which comprises a steering handle and a driving wheel, comprising:

a tubular brake actuator adapted for coaxially mounting at said steering handle for a hand of said rider griping said brake actuator to steer said rider propelling vehicle via said steering handle;
a brake unit adapted for operatively mounting at a position close to said driving wheel; and
a brake cable having a driving end coupling with said brake unit and an opposed actuating end extended to couple with said brake actuator to retain said brake actuator at a normal driving position, wherein at said driving position, said brake unit is arranged for positioning apart from said driving wheel such that said driving wheel is allowed to freely rotate, and at a braking position, said brake actuator is rotatably, longitudinally and outwardly slid with respect to said steering handle to pull said brake cable that said brake unit is arranged for biasing against said driving wheel to control a rotational speed of said driving wheel such that said rider propelling vehicle is adapted for being well controlled while said rider keeps said hand thereof at said steering handle.

15. A rotation control brake system, as recited in claim 14, wherein said rotation control brake system further comprises a rotational guider which has a guiding slot spirally formed on a circumferential wall of said brake actuator and comprises a guiding arm adapted for fastening on said steering handle to slidably engage with said guiding slot in such a manner that when said brake actuator is rotated with respect to said steering handle, said guiding arm is guided to slide along said guiding slot to drive said brake actuator to outwardly slide with respect to said steering handle, so as to pull said brake cable.

16. A rotation control brake system, as recited in claim 15, wherein said guiding slot has a predetermined length longer than a traveling distance of said brake actuator between said driving position and said braking position such that said brake actuator is guided to turn slide with respect to said steering handle simultaneously.

17. A rotation control brake system, as recited in claim 15, wherein said guiding slot, having a S-shaped, is inclinedly and outwardly extended on said circumferential wall of said brake actuator such that when said brake actuator is rotated with respect to said steering handle, said guiding arm is guided to slide along said guiding slot end-to-end, so as to push said brake actuator to outwardly and longitudinally slide with respect to said steering handle.

18. A rotation control brake system, as recited in claim 16, wherein said guiding slot, having a S-shaped, is inclinedly and outwardly extended on said circumferential wall of said brake actuator such that when said brake actuator is rotated with respect to said steering handle, said guiding arm is guided to slide along said guiding slot end-to-end, so as to push said brake actuator to outwardly and longitudinally slide with respect to said steering handle.

19. A rotation control brake system, as recited in claim 15, wherein said guiding arm has an arm body adapted for upwardly mounting on a circumferential wall of said steering handle to extend through said guiding slot, and an enlarged head portion integrally extended from said arm body at a position above said circumferential wall of said brake actuator to retain said arm body within said guiding slot in position.

20. A rotation control brake system, as recited in claim 18, wherein said guiding arm has an arm body adapted for upwardly mounting on a circumferential wall of said steering handle to extend through said guiding slot, and an enlarged head portion integrally extended from said arm body at a position above said circumferential wall of said brake actuator to retain said arm body within said guiding slot in position.

21. A rotation control brake system, as recited in claim 14, wherein said rotation control brake system further comprises a tubular anti-slipping shelter, which is made of anti-slipping material, coaxially mounted at said brake actuator to drive said brake actuator to rotate, wherein an inner circumferential wall of said anti-slipping shelter is frictionally engaged with said brake actuator for enhancing a gripping ability of said brake actuator when said hand of said rider grips and turns said anti-slipping shelter.

22. A rotation control brake system, as recited in claim 18, wherein said rotation control brake system further comprises a tubular anti-slipping shelter, which is made of anti-slipping material, coaxially mounted at said brake actuator to drive said brake actuator to rotate, wherein an inner circumferential wall of said anti-slipping shelter is frictionally engaged with said brake actuator for enhancing a gripping ability of said brake actuator when said hand of said rider grips and turns said anti-slipping shelter.

23. A rotation control brake system, as recited in claim 20, wherein said rotation control brake system further comprises a tubular anti-slipping shelter, which is made of anti-slipping material, coaxially mounted at said brake actuator to drive said brake actuator to rotate, wherein an inner circumferential wall of said anti-slipping shelter is frictionally engaged with said brake actuator for enhancing a gripping ability of said brake actuator when said hand of said rider grips and turns said anti-slipping shelter.

\* \* \* \* \*